Sept. 8, 1959      SEIICHI KOJIMA      2,903,390

METHOD OF MAKING LAMINATED FURNITURE OR PART THEREOF

Filed Oct. 29, 1956

INVENTOR
SEIICHI KOJIMA
BY *James M. Heitman*
ATTORNEY

2,903,390
METHOD OF MAKING LAMINATED FURNITURE OR PART THEREOF

Seiichi Kojima, Chigusa-ku, Nagoya, Japan

Application October 29, 1956, Serial No. 619,037

Claims priority, application Japan October 29, 1955

6 Claims. (Cl. 154—125)

This invention relates to a new and improved method of making furniture.

In the manufacture of various articles of wooden furniture such as chairs, tables, beds, and the like, conventional jointings employing tenons, dovetails, or the like, are still widely in use for assembling or securing together in fixed or rigid relation the different members of such furniture, notwithstanding the recent remarkable developments of various types of wood machine tools. Thus, heretofore, a sizable amount of hand work has been necessary at least at the later steps of such manufacture. As is readily seen, this practice has not favored mass production of furniture, and thus wooden furniture so far has been apt to lack sturdiness as well as uniformity.

The object of the present invention is to provide a new and improved method in which not only said deficiencies in the practice heretofore followed in the making of furniture are eliminated, but also the manufacture of furniture of various new materials and novel design is facilitated, by providing various articles of furniture or parts thereof of laminated structure comprising a series of component layers or sheets of solid or granular material laid upon one another and thus eliminating the need of conventional joints including tenons, dovetails or the like for securing together different members of the furniture.

According to the present invention there is provided a method of making laminated furniture or part thereof which comprises stacking up in registration a series of thin boards or sheets, each comprising a portion to constitute corresponding one of component layers of the laminated furniture or part thereof and the remaining portion to be removed from said first portion, with or without a suitable adhesive agent laid over said first portion of respective sheets, clamping said stack of sheets preferably while heating so that said first portions of respective sheets are secured together in fixed or rigid relation to form an integral laminated structure, and removing said remaining portions of respective sheets from said integral structure.

As component layers or sheets of the laminated structure according to the present invention, pressed boards or sheets of granular permeable material such as saw dust or wood chips are preferred, though solid boards or sheets of substantially homogeneous material such as veneer sheets or plastic plates may also be conveniently employed.

In preparing such pressed boards or sheets of granular material, they may be impregnated, if necessary for holding their shape, with a weak bonding agent for example of synthetic resin. Only, in this case, it is required that such bonding agent is used in an amount such as to enable the sheets bonded through the impregnation to be readily crumbled or disintegrated when they are immersed in a suitable fluid and, if necessary, simultaneously subjected to forced vibration. It will be understood that such impregnated sheets may be crumbled or disintegrated by hammering, scraping or any other like mechanical operation. Such pressed boards or sheets of granular material are each sufficiently impregnated with a suitable adhesive, which is comparatively strong, over that portion thereof which is to constitute any one of component layers of the desired laminated furniture or part thereof by means of a printing machine or transcriber, with the remaining portion left free from such impregnation. In practice, such sheets are preferably stacked up in a series of piles immediately after their passage through respective printing machines, which piles each include sheets of the same pattern of impregnation corresponding to the configurations of respective component layers of the laminated furniture or part thereof.

A series of component sheets taken one from each pile are then stacked up in due order in a manner so that said sheets are placed in proper relationship to each other with respect to the impregnated portions thereof. To this end, it is desirable to employ rectangular sheets of a definite size, and to impregnate them over such areas thereof so that, when said sheets are stacked up in registration or with their edges registered, they are automatically placed in proper relationship to each other with respect to their areas or patterns of impregnation.

The stack of component sheets are clamped and heated, for example by means of a high frequency heating press, to make said impregnated portions of respective sheets adhere closely to each other to form an integral laminated structure. Said stack of sheets are then immersed in a suitable fluid bath and, if necessary, simultaneously subjected to forced vibration, or alternatively subjected to hammering, scraping or other like mechanical operation so that the adhesive-free portions or above described remaining portions of respective sheets may easily be crumbled or disintegrated or broken off from said integral structure which constitute the desired laminated furniture or part thereof.

When veneer sheets, Bakelite plates or other solid impermeable sheets of substantially homogeneous material are employed as said component sheets, they are similarly stacked up in due order with some suitable adhesive agent laid over respective portions thereof which are to constitute the desired laminated furniture or part thereof. Only, in this case, before such sheets are stacked up, and preferably before the application of the adhesive, they are perforated along the profiles of said portions as by a punching machine or drill press, in order that portions outside of said profiles may readily be torn or plucked off by mechanical operation after the sheets have been clamped together to form an integral laminated assembly.

Further, as will be well understood in the art, regardless of the type of materials of the component sheets, the laminated structure cleared of unnecessary portions by immersion or mechanical operation, as described above, is preferably subjected to buffing or polishing operation and coated with lacquer, varnish, paint or the like materials to give a smooth and beautiful appearance as desired, to the laminated furniture or part thereof.

As will be evident from the above description, that amount of granular material which has been collected through the crumbling or disintegration of the waste portions from the laminated assembly by subjecting them to immersion or mechanical operation can be recovered for repetitive use as raw material for component sheets as described above. This is one of the important advantages of the present invention.

For a fuller understanding of the nature and object of the invention, reference should be had to the following detailed description taken in connection with the accompanying drawings illustrating by way of example one practical embodiment of the invention. In these drawings.

Figure 1:
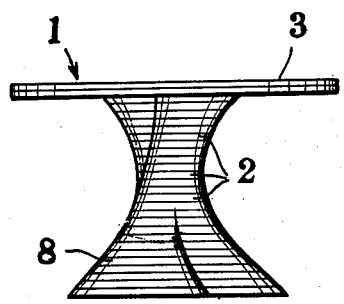
Figure 1 shows a front elevation of a table constructed in accordance with the invention.

The process of making laminated furniture in accordance with the present invention will now be described in detail. In Figure 1, there is shown a table 1 made according to the present invention, which is composed of a plurality of parallel layers 2 preferably of a certain thickness, each extending in parallel to the face board 3 of the table or in a direction most convenient for the laminar construction of the table.

Figure 2:
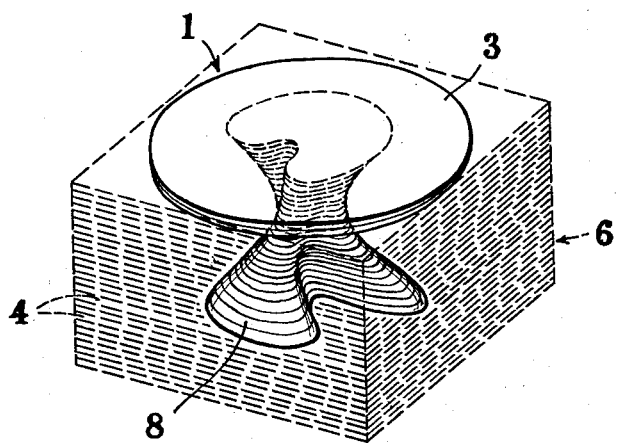
Figure 2 is a perspective view diagrammatically showing the manner in which the table shown in Figure 1 is built up of a series of thin component layers.

In making such laminated table preferably a series of rectangular pressed sheets as indicated at 4 are prepared in a conventional way from granular material such as saw dust or wood chips with the aid of a weak bonding agent. Such bonding agent must be used in an amount just sufficient to hold the shape of said pressed sheets so as to allow them to be readily disintegrated when immersed in a fluid bath. The sheets are then impregnated as indicated at 5 with a suitable adhesive through respective stencils each producing a pattern similar to the section of the corresponding layer of the desired laminated structure. Said adhesive must be strong enough not to be affected by said fluid bath. Said sheets thus impregnated are stacked up in due order with their marginal edges registered, and then clamped and heated by a high frequency heating press so that impregnated portions 5 of said sheets may stick firmly to each other to form an integral laminated assembly 6 as shown by the dotted lines in Figure 2. That portion of said assembly 6 which is composed of marginal portions 7 of respective sheets 4 is conveniently removed by immersing and subjecting to forced vibration said assembly 6 in a bath of water or any suitable solution depending upon the type of said bonding agent used in forming such component sheets or by subjecting said assembly to hammering, scraping or any other like mechanical operation. In this case, the face board 3 of the table 1 may be prepared independently of the present invention and joined to the base portion 8, which is advantageously made in accordance with the invention.

Figure 3:
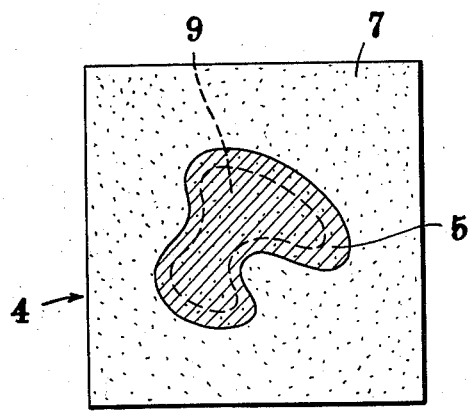
Figure 3 is a plan view of one of said component sheets showing a portion thereof impregnated with a suitable adhesive.

As indicated by the dotted line in Figure 3, a limited area 9 within the impregnated portion 5 of component sheets may not be impregnated with the adhesive so as to make the base 8 of the table hollow and lighter in weight. On the other hand, it will readily be understood that, if additional strength is required in the laminated structure as in a portion of a markedly reduced cross-section, a suitable reinforcing rod or the like may be embedded or inserted within such portion.

As is evident from the above description, the method in accordance with the invention has many important advantages over the prior art of furniture making. Above all, it eliminates most of the hand works heretofore needed in the manufacture of wooden furniture and is quite suited for mass production of various articles of furniture, allowing ample supply of furniture of standard specifications with reduced cost of manufacture due to mass production and material recovery. In addition, according to the present invention, various articles of furniture of new materials and novel design can easily be manufactured because of the simple and integral structure of the invention, with no limitations due to the use of conventional joints including tenons, dovetails, or the like.

In this specification and the accompanying drawings I have shown and described a preferred practical embodiment of my invention and suggested various modifications thereof; but it is to be understood that these are not to be exhaustive or limiting of the invention, but, on the contrary, are given for purposes of illustration in order that others skilled in the art may fully understand the invention and the principles thereof and the manner of applying it in various forms, each as may be best suited to the conditions of a particular use.

What I claim is:

1. A method of making laminated furniture which comprises stacking up in registration a series of sheets of material, each sheet comprising a portion to constitute one of the component layers of the laminated furniture and the remaining portion to be readily removed from said first portion, applying a bonding agent to the portions of each sheet which are to form a layer of the laminated structure, clamping said stack of sheets preferably while heating so that said first portions of respective sheets are secured together in fixed and rigid relation to form an integral laminated structure, and removing said remaining portions of respective sheets from said integral structure.

2. A method of making laminated furniture which comprises stacking up in registration a series of sheets of granular material, each sheet comprising a portion impregnated with a bonding agent to constitute one of the component layers of the laminated furniture and the remaining portion free from such impregnation to be readily removed from said first portion, subjecting said stack of sheets to heat under pressure so that said first portions of respective sheets are secured together in fixed and rigid relation to form an integral laminated structure, and immersing said structure in a bath of suitable fluid so as to cause said remaining portions of respective sheets to be disintegrated away from said integral laminated structure.

3. A method of making laminated furniture which comprises stacking up in registration a series of sheets of solid impermeable material, each sheet comprising a portion to constitute one of the component layers of the laminated furniture, the remaining waste portions provided with a perforation around the profile of said first portion, and applying a suitable adhesive agent to the portions of each sheet which are to form a layer of the laminated structure, clamping said stack of sheets so that said first portions of respective sheets adhere closely to each other in fixed and rigid relation to form an integral laminated structure, and tearing off mechanically said remaining portions of respective sheets from said integral laminated structure.

4. A method of making laminated furniture according to claim 3, including the further steps of subjecting said laminated structure to buffing or polishing operation and applying coating material onto the external surface thereof.

5. A method of making laminated furniture which comprises stacking up in registration a series of sheets of granular material, each sheet comprising a portion impregnated with a bonding agent to constitute one of the component layers of the laminated furniture and the remaining portion free from such impregnation to be readily removed from said first portion, subjecting said stack of sheets to heat under pressure so that said first portions of respective sheets are secured together in fixed and rigid relation to form an integral laminated structure, and immersing and simultaneously subjecting to forced vibration said integral laminated structure in a bath of suitable fluid so as to cause said remaining portions of respective sheets to be disintegrated away from said integral structure.

6. A method of making laminated furniture which comprises stacking up in registration a series of sheets of granular material, each sheet comprising a portion impregnated with a bonding agent to constitute one of the component layers of the laminated furniture and the remaining portion free from such impregnation to be readily removed from said first portion, subjecting said stack of sheets to heat under pressure so that said first portions of respective sheets are secured together in fixed and rigid relation to form an integral laminated structure, and subjecting said structure to a hammering operation thereby to crumble and disintegrate said remaining portions of respective sheets from said integral laminated structure.

References Cited in the file of this patent

UNITED STATES PATENTS

| | | |
|---|---|---|
| 746,143 | Peacock | Dec. 8, 1903 |
| 1,507,949 | Angier | Sept. 9, 1924 |
| 1,839,889 | Palais | Jan. 5, 1932 |
| 2,000,922 | Church | May 14, 1935 |
| 2,189,592 | Perera | Feb. 6, 1940 |
| 2,242,631 | Stillman | May 20, 1941 |